United States Patent [19]

Grüne

[11] 3,791,870

[45] Feb. 12, 1974

[54] PROCESS FOR REACTIVATING A FUEL CELL BATTERY

[75] Inventor: Horst Grüne, Kelkheim/Taunus, Germany

[73] Assignee: Varta Aktiengesellschaft, Frankfurt/Main, Germany

[22] Filed: Apr. 13, 1970

[21] Appl. No.: 28,095

[30] Foreign Application Priority Data

Apr. 11, 1969 Germany............................ 1918353

[52] U.S. Cl................................................. 136/86 E
[51] Int. Cl. .......................................... H01m 27/00
[58] Field of Search............................... 136/86, 164

[56] References Cited
UNITED STATES PATENTS

| | | | |
|---|---|---|---|
| 3,134,697 | 5/1964 | Nudrach........................... | 136/86 D |
| 3,432,354 | 3/1969 | Jost................................... | 136/86 A |
| 3,207,682 | 9/1965 | Oswin et al.................... | 136/86 D X |
| 3,311,508 | 3/1967 | Biddick et al.................. | 136/86 D X |
| 3,479,226 | 11/1969 | Oswin .............................. | 136/86 R |

OTHER PUBLICATIONS

ASTIA – AD 248,480; 3/31/1961; pp. 1 & 9–11, 17–21.

*Primary Examiner*—A. B. Curtis
*Attorney, Agent, or Firm*—Gerard J. Weiser

[57] ABSTRACT

Process for activating a hydrogen electrode in a fuel cell during or prior to the operation of the cell by supplying hydrogen to both electrodes for a specified limited time, establishing certain electrically conductive conditions for a specified time, and discontinuing the hydrogen supply to the oxygen electrode. The cell then resumes its optimum operating capacity.

14 Claims, No Drawings

PROCESS FOR REACTIVATING A FUEL CELL BATTERY

The invention relates to a method for activating or regenerating or causing the recovery of a hydrogen or fuel gas electrode in a fuel cell during or prior to the operation of the cell. The cell which had impaired capacity prior to treatment operates thereafter again at its optimum capacity.

During the operation of fuel cells a deficiency of hydrogen feed to the fuel electrode may occur by overloading the cell, by over-drawing too much electrical current therefrom, or when nitrogen or other inert gas accumulates at the electrode, or for other reasons. Sometimes the electrodes can be made to recover, but in practice no recovery at a practical rate can be obtained. The problem is especially serious for the electrodes positioned furthest away from the terminal electrodes, i.e., the electrodes closer to the center of the battery. A like problem occurs upon long term storage of batteries where the fuel electrode is being poisoned or inactivated by the air which forms with the metal of the electrode a metal hydroxide, like nickel hydroxide which prevents efficient operation of the electrode.

In conventional fuel cells, nickel is often contained at the catalyst for the hydrogen electrode; the nickel offers an extensive surface for reaction. In general, prior to charging with hydrogen, the surface of the nickel catalyst is covered with nickel hydroxide. Because of the large surface presented by the electrode, the surface layer of nickel hydroxide is very extensive. For an electrochemical conversion of hydrogen, the catalyst is only catalytically active when this layer is penetrated or broken up. With the exception of the surface layers of nickel hydroxide which are already reduced to nickel, the activation of a catalyst for the conversion of the hydrogen gas and the reduction of the remaining nickel hydroxide layer proceeds by way of an autocatalytic reaction which has an induction period.

In the operation of batteries which contain hydrogen electrodes, for instance, nickel electrodes which have a large and extensive surface as a catalyst, it is first necessary to load or charge each hydrogen electrode with hydrogen. Only thereafter is the electrode operative, and it can then be charged with the selected current density. When such metal electrodes (which are made from non-noble metals and exhibit a large catalytic surface) are loaded with hydrogen by exposing each electrode first without electrical loading to hydrogen gas, it has been observed that a considerable time lapse is necessary until the electrodes can be electrically loaded. This induction period is quite lengthy because of the extensive surface of the nickel due to the large amount of nickel hydroxide present. The induction period limits the efficiency of the operation of the fuel cell and its recovery as indicated below.

For the electrochemical conversion of the oxygen in a fuel cell, there is used oxygen electrodes which contain silver as catalyst for the conversion of the oxygen; on such electrodes, it is a common practice to use a limited amount of nickel as a skeleton material. In the case of the oxygen electrode, the above described induction period is especially short, this in part because of the limited amount of nickel surface and hence the limited amount of nickel hydroxide which can be formed. Accordingly, such oxygen electrodes rapidly reach their hydrogen potential and this promotes to restore thereafter the potential of the hydrogen electrode which is electrically connected to the oxygen electrode. As a result, the induction period of the hydrogen electrode is very significantly shortened.

It is therefore an object of the invention to provide a process for reactivating or activating as rapidly as possible such batteries containing the above described electrodes.

The batteries or cells in which this problem occurs are those which are constructed with a hydrogen electrode which, in an alkaline electrode, forms a stable hydroxide layer at the surface of the electrode. These are metals and alloys thereof which form nickel hydroxide having a potential which is slightly more positive than the reversible hydrogen potential (150–180 mV), in the electrolyte system used. The more common hydrogen electrodes where this problem is most acute are those electrodes containing Raney nickel, Raney iron, or Raney cobalt, and the alloys of these Raney metals. The oxygen electrodes contain carbonyl nickel and/or carbonyl iron.

The invention provides a process which contributes a long awaited solution to the above described problems. The process of the invention comprises supplying hydrogen gas to the hydrogen and to the oxygen electrodes and, when the oxygen electrode has reached the hydrogen potential, short-circuiting to provide electronic conductance by connecting the hydrogen and oxygen electrodes, maintaining such electronic connection until the hydrogen electrodes reach at least the neighbourhood of the reversible hydrogen potential, interrupting the current passage between the oxygen and hydrogen electrodes, and connecting the oxygen electrodes to the oxygen supply, if it is desired to operate the battery immediately following the process of activation. Preferably prior to supplying oxygen to the oxygen electrode, it can be rinsed or vented with air to free it of hydrogen.

The invention is of particular importance for those fuel cell batteries which contain as hydrogen electrode Raney nickel, Raney iron, or Raney cobalt, or the alloys of these metals and, but not necessarily so, those batteries which the oxygen electrode has carbonyl nickel or carbonyl iron, as the skeleton for the electrode.

The process of the invention provides for a much faster recovery of the fuel cell battery so that it can be operated again at full efficiency.

An important aspect of the invention is predicated on the fact that the oxygen electrodes which contain a material, particularly a metal which can be activated by hydrogen, reach the hydrogen reversible potential very rapidly (more rapidly than the hydrogen electrodes) when the oxygen electrodes are provided with hydrogen gas. The electrodes are then capable to work as hydrogen anodes. The determination of when the oxygen electrodes reach the reversible hydrogen potential can be determined in accordance with the process by measurement of the potential of the electrodes against a reference electrode, such as a saturated calomel electrode, in accordance with known techniques. The determination of the potential can also be determined without a reference electrode by measuring the voltage of the cells at certain time intervals.

In accordance with the process, the hydrogen electrodes hardly change potential when the hydrogen is supplied both to the hydrogen and the oxygen electrodes, whereas the potential of the oxygen electrodes starts gradually decreasing until it reaches the reversible hydrogen potential. This aspect of the process generally takes a relatively short time as between 15 to 25 minutes.

When the oxygen electrodes have reached the hydrogen potential, the hydrogen electrodes are then connected to the oxygen electrodes by an electronic conductance. After an initial short current increase, the current rapidly drops to a lower value. It can then be observed that the potential of the hydrogen electrode is brought up to or increased by the oxygen electrode to the hydrogen potential. In this manner, the charging of the electrodes with hydrogen is remarkably accelerated. The potential of the hydrogen electrodes reaches the hydrogen evolution potential very rapidly, for instance in about 10 minutes after electronically short-circuiting the oxygen and hydrogen electrodes. At that moment, the hydrogen electrodes already have been so recuperated that they are capable of being loaded with f.i. 50 mV/cm$^2$ in a battery connected for normal operation.

The connections providing electronic conductance between the various electrodes and cells can be established in accordance with conventional means. It is preferred, however, that the resistance of the electrical connections be low, and for this purpose, copper wires of about 1 mm in diameter are entirely satisfactory.

In accordance with the invention, fastest results are obtained when an electronic connection is established between the oxygen electrodes and the hydrogen electrodes of a battery both between electrodes of opposite polarity in the same cell. In this manner, the fastest rejuvenation of the hydrogen electrodes with assistance from the oxygen electrodes can be provided. However, the process of the invention can also be applied without connecting both of these sets of electrodes of opposite polarity. The process can advantageously be carried out by connecting electrodes of opposite polarity in adjoining cells. When electronic connections are established only between electrodes of opposite polarity in adjoining cells and the process is carried out as described, the rejuvenation of the hydrogen electrodes tends to be slower than with additional connections of the electrodes of opposite polarity in the same cell. However, this may be entirely satisfactory when a battery accidentally breaks down, as described above, and it is desired to rejuvenate or place it back in operative condition by rejuvenating the hydrogen electrodes over a certain time period, such as overnight.

It is noteworthy, too, that in a battery, neighboring cells are electrolytically connected by channels or bridges of electrolyte flowing from one neighboring cell to another, the electrolyte bridge providing the connection for the electrons transferred between the various adjoining neighboring cells. In a battery which is wired and electrically connected for operation, such as battery connected in series, to operate the process of the invention it is not necessary to connect the electrodes of opposite polarity in neighboring cells, the electrolyte bridge providing electrical connection within the system. The rejuvenation process of the invention then is slower under such circumstances than if electronic connection between electrodes of opposite polarity in adjoining cells is established and further electronic connection is provided between the electrodes of opposite polarity in the same cell.

It is therefore apparent from the above description that the speed at which the battery can be brought back to operative conditions can be readily regulated in accordance with the process of the invention. Without establishing any electronic connection between the electrodes of opposite polarity, such as an oxygen and hydrogen electrode in neighboring cells, and relying exclusively on the electrolytic bridges and canals between the adjoining cells, the process takes the longest period of time, generally a few days. The process can be accelerated by carrying it out on fuel cell battery in which the adjoining cells are electronically connected in series, as is commonly practiced. This embodiment of the invention is particularly well suited in the case of a fuel cell battery which has broken down during operation. It can be rejuvenated in accordance with the process and then continued to be operated at the necessary current load. Reactivation may take between 1 and 3 hours. To accelerate the process of the invention even further, electronic connection is also established between the electrodes of opposite polarity in the same cell. In this manner, the reactivation process can be cut down to less than an hour, such as 8 to 15 minutes.

It is evident to one skilled in the art that when the fuel cell is operative, electric current is withdrawn therefrom.

It is to be noted that the electrodes which suffer most from this type of inactivation hence, inability to carry a full electrical load and thus act to limit the capacity of the fuel cell battery, are those cells which are positioned further away from the two extremities of the fuel cell battery. If desired, the process of the invention may be applied to those cells which are in greatest need for rejuvenation. Only a certain number of the cells of a battery need to be so connected electronically as to accelerate their rejuvenation, whereas it is not necessary to electronically connect all the cells or all the electrodes, as described above.

It is to be noted, too, that in the aspect of the process wherein both the hydrogen and oxygen electrodes are supplied with hydrogen, it is not necessary to supply the hydrogen constantly to the hydrogen electrode. This can be done intermittently, as long as the supply of hydrogen is adequate to maintain the potential of the hydrogen electrode.

The following examples are merely illustrative of the invention and are not to be construed as a limitation thereto.

EXAMPLE 1

A fuel cell battery with 16 cells is filled with electrolyte (6 NaOH) and the battery is then raised to the operating temperature of 60° C. It had been determined that the battery was not operating most effectively because of the condition of the hydrogen electrodes. The hydrogen and oxygen electrodes are supplied with hydrogen gas under 1 atü pressure. (1 atü pressure is equivalent with overpressure of 1 atmosphere gauge.) After 15 minutes, the oxygen electrodes reach the reversible hydrogen potential. Thereafter, the 16 cells are connected in series by copper lines, and these lines are connected by copper wiring bridges (1 mm diameter). After 10 minutes, the hydrogen electrodes reach the hydrogen evolution potential. The current is interrupted by disconnecting the copper bridges and the oxygen electrode is supplied with oxygen under pressure (0.9 atü). Thereafter, the battery can be operated effectively and efficiently and loaded with a normal current.

EXAMPLE 2

A fuel cell battery having eight cells and electrically connected in series is filled with electrolyte (6 NaOH) and the temperature is raised to 60° C. All electrodes, hydrogen and oxygen, are supplied with hydrogen under pressure (0.9 atü) for 3 hours. Thereafter, the battery can be operated with a normal load.

EXAMPLE 3

Using the 16 fuel cell battery of Example 1, the process is repeated. The cells of the battery are electrically connected in series, as shown in Example 1, and the hydrogen and oxygen electrodes are supplied with hydrogen under pressure. Hydrogen is fed to the hydrogen and oxygen electrodes until the oxygen electrodes have reached the hydrogen potential. When the hydrogen electrodes have reached the hydrogen evolution potential, the oxygen electrodes are supplied with oxygen at a pressure of 0.9 atü and the battery is operated again effectively. The rejuvenation of the hydrogen electrodes of the fuel cell battery took about 1 to 3 hours.

EXAMPLE 4

A fuel cell battery of Example 2 is rejuvenated after it had broken down because of catalytic inactivation of the hydrogen electrodes. In this case, the electrodes of opposite polarity in the separate neighboring cells are not yet connected by conductors; also, there is no electronic connection in series, the electrical wiring having been dismantled. The process is applied by supplying hydrogen under pressure of about 1 atü after heating the fuel cell battery to about 60° C. When the hydrogen electrodes have reached the hydrogen potential, the hydrogen supply to the oxygen electrode is interrupted and oxygen supply to the oxygen electrode is resumed. The battery can be loaded with operating current load. The reactivation of the battery took several days.

The process of the invention is particularly valuable at lower temperatures, that is, at temperatures approximately below about 65° C. because it is normally particularly difficult to rejuvenate such batteries.

The process of the invention is a significant contribution to the efficient operation of fuel cell batteries.

I claim:

1. The process for activating a hydrogen electrode in a fuel cell battery having electrodes with a stable metal hydroxide layer on their surface, the cells of which are not electronically connected in series, which process comprises supplying hydrogen to both the hydrogen and the oxygen electrodes until the oxygen electrode has reached the hydrogen potential, thereafter electronically establishing a shorting connection between the hydrogen and oxygen electrodes within the same cell during continued flow of hydrogen until the hydrogen electrodes have reached the hydrogen evolution potential, to break up the metal hydroxide layer and reduce the hydroxide to metal, and then interrupting said shorting connection between the hydrogen and oxygen electrodes, whereby the fuel cell battery can resume normal operation.

2. The process of claim 1 wherein the hydrogen electrode has potential more positive than the reversible hydrogen potential.

3. The process of claim 1 which is carried out at a temperature approximately not higher than about 65° C.

4. The process of claim 1 which is terminated in less than 1 hour.

5. The process for reactivating a hydrogen electrode in a fuel cell battery having a multiplicity of cells containing and connected by an alkaline electrolyte, said cells being electronically connected in series for the passage of electric current and comprising a hydrogen electrode comprising nickel, with a surface layer of nickel hydroxide, and an oxygen electrode comprising a hydrogen catalyst, said process comprising supplying hydrogen to both the hydrogen and the oxygen electrodes until the oxygen electrode has reached the hydrogen potential, thereafter establishing an electronic shorting connection between the hydrogen and the oxygen electrodes within the same cell while continuing to supply hydrogen until the hydrogen electrode has reached at least the neighbourhood of the reversible hydrogen potential to break up the nickel hydroxide layer and reduce the hydroxide to nickel, then interrupting the shorting connection between the hydrogen and oxygen electrodes, and supplying oxygen to the oxygen electrode to resume normal fuel cell battery operation.

6. The process of claim 5 wherein the hydrogen electrode comprises Raney nickel, Raney iron, Raney cobalt or an alloy of these metals.

7. The process of claim 5 wherein the oxygen electrode comprises carbonyl nickel or carbonyl iron or an alloy of these two metals.

8. The process of claim 5 wherein the oxygen electrode has a smaller amount of nickel hydroxide formed than the hydrogen electrode, and thereby reaches its hydrogen potential before the hydrogen electrode.

9. The process for reactivating at least one hydrogen electrode in a fuel cell battery comprising a multiplicity of cells having in-series electronic conductance and electrolyte connections therebetween, said cells having electrodes with a stable metal hydroxide layer on their surface, which process comprises supplying hydrogen to at least one pair of hydrogen and oxygen electrodes in the fuel cell battery until the oxygen electrode has reached the hydrogen potential, thereafter electronically shorting the electrodes of opposite polarity of the same cell while continuing to supply hydrogen until the hydrogen electrode has reached the hydrogen potential to break up the metal hydroxide layer and reduce the hydroxide to metal, interrupting the short between said electrodes and supplying the oxygen electrode with oxygen to resume normal fuel cell operation.

10. The process for activating or reactivating a hydrogen electrode in a fuel cell having electrodes with a stable metal hydroxide layer on their surface, comprising the steps of supplying hydrogen to both said hydrogen electrode and to an oxygen electrode of said fuel cell, in the presence of an electronic shorting connection permitting electrical conduction between said hydrogen and oxygen electrode, while abstaining from supplying any external source of energy to said electrode to break up said metal hydroxide layer and reduce the hydroxide to metal, and interrupting said shorting connection and discontinuing said supplying of hydrogen to the oxygen electrode when said hydrogen electrode reaches substantially its reversible hydrogen potential.

11. The process of claim 10 further comprising the step of supplying oxygen to said oxygen electrode following said discontinuing of hydrogen supply to resume normal fuel cell operation.

12. The process of claim 10 in which hydrogen continues to be supplied to said hydrogen electrode after said discontinuing of hydrogen supply to said oxygen electrode.

13. The process of claim 10 wherein the shorting connecting is a copper wire.

14. The process of claim 10 wherein the hydrogen is supplied to both electrodes concurrently.

* * * * *